United States Patent
Yamada et al.

[11] Patent Number: 5,955,047
[45] Date of Patent: Sep. 21, 1999

[54] PROCESS FOR PRODUCING ALKALI METAL POLYPHOSPHATES

[75] Inventors: Yasuko Yamada; Kazuhiko Mori; Takaaki Arashida; Takayuki Koda; Takeru Satou; Hisao Itoh, all of Kanagawa, Japan

[73] Assignee: Ajinomoto Co., Inc., Tokyo, Japan

[21] Appl. No.: 09/129,698

[22] Filed: Aug. 5, 1998

[30] Foreign Application Priority Data

Aug. 5, 1997 [JP] Japan .................................. 9-210469

[51] Int. Cl.⁶ ........................... C01B 25/39; C01B 25/41; C01B 25/42; C01B 25/445
[52] U.S. Cl. ........................... 423/305; 423/314; 423/315
[58] Field of Search ................... 423/305, 314, 423/315

[56] References Cited

U.S. PATENT DOCUMENTS

| | | | |
|---|---|---|---|
| 3,233,967 | 2/1966 | Shen | 423/315 |
| 3,309,174 | 3/1967 | Pals | 423/315 |
| 3,382,037 | 5/1968 | Shaffery et al. | 423/314 |
| 3,387,924 | 6/1968 | Heymer et al. | 423/315 |
| 3,682,588 | 8/1972 | Fuchs et al. | 423/315 |
| 4,431,620 | 2/1984 | Schenck et al. | 423/315 |
| 4,556,525 | 12/1985 | Berglund | 423/315 |

FOREIGN PATENT DOCUMENTS

| | | | |
|---|---|---|---|
| 831905 | 1/1970 | Canada | 423/315 |
| 723245 | 2/1955 | United Kingdom | 423/315 |
| 1026675 | 4/1966 | United Kingdom | 423/315 |
| 1237710 | 6/1971 | United Kingdom | 423/315 |
| 1324363 | 7/1973 | United Kingdom | 423/315 |

*Primary Examiner*—Wayne Langel
*Attorney, Agent, or Firm*—Oblon, Spivak, McClelland, Maier & Neustadt, P.C.

[57] ABSTRACT

A process for producing an alkali metal polyphosphate, comprising heating a solution comprising a solvent, alkali metal ions, phosphate ions, and 3 to 50% by weight of organic matter, wherein the solution contains, in total, 5 to 65% by weight of the alkali metal ions and the phosphate ions, and the ratio M/P is 1.0 to 3.0, wherein M is the number of moles of alkali metal ions in the solution and P is the number of moles of orthophosphate ions in the solution, at a temperature of 800° to 1200° C. in the presence of excess air, optionally after the solution is at least partially dried to solid, to produce the alkali metal polyphosphate.

18 Claims, 1 Drawing Sheet

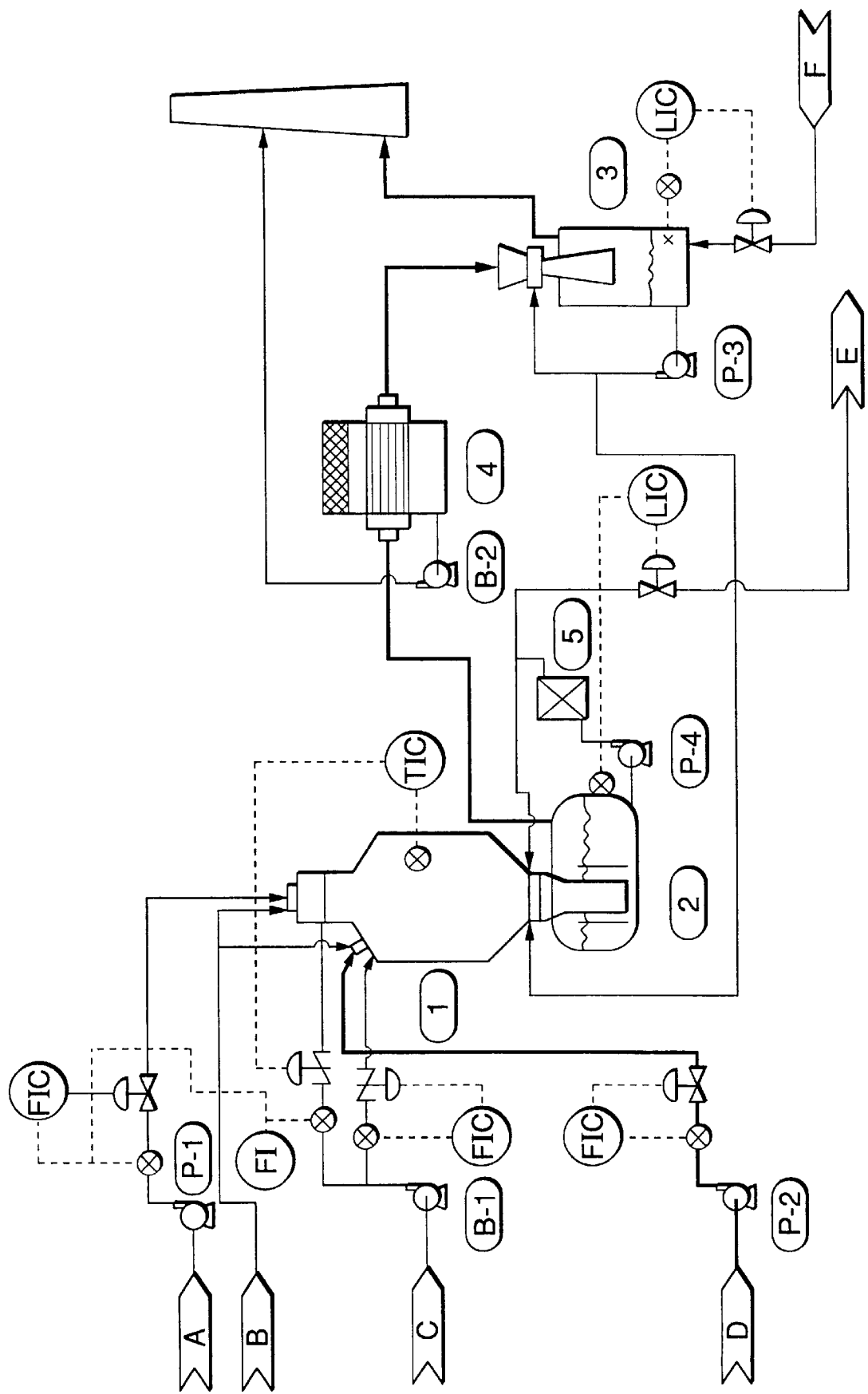

5,955,047

PROCESS FOR PRODUCING ALKALI METAL POLYPHOSPHATES

BACKGROUND OF THE INVENTION

1. Field of the Invention

The present invention relates to a process for producing polyphosphates, such as a pyrophosphate, a tripolyphosphate, a hexametaphosphate, and the like, of an alkali metal. Alkali metal polyphosphates are useful as builders for detergents or as food additives.

2. Discussion of the Background

Alkali metal polyphosphates have conventionally been produced by starting with a solution of high purity phosphoric acid obtained by, for example, the wet process. Known processes for the production of an alkali metal polyphosphate include a two-stage process consisting of spray drying and calcination and a one-stage process consisting of spray combustion. Modifications have been introduced to obtain crystals with improved solubility. As for production of a polyphosphate starting with a phosphoric acid solution containing organic matter, a process comprising adding an oxidizing agent to phosphoric acid manufactured by the wet process which contains up to 3% by weight of organic matter based on $P_2O_5$, followed by heating at 300° to 500° C. (see JP-B-56-49847, the term "JP-B" as used herein means an "examined Japanese patent publication"). According to this process, the permissible content of organic matter of the starting phosphoric acid is limited. If the organic content is too high, the organic matter cannot be eliminated sufficiently. If the phosphoric acid to be heated at the above-mentioned temperature has an organic content exceeding the limit, an extra step for removing residual organic matter, such as crystallization or the like, would be required and, in addition, the organic matter thus separated should be given such a treatment as an activated sludge process. This will complicate the whole process and increase the cost.

Generally, alkali metal polyphosphates having various degrees of phosphoric acid condensation are produced by controlling the molar ratio of an alkali metal element to an orthophosphate group ($PO_4$) (hereinafter referred to as an M/P molar ratio). For example, acid pyrophosphates are produced at an M/P molar ratio of 1.0 and at a heating temperature of 200° to 250° C.; hexametaphosphates at an M/P molar ratio of 1.0 and at a temperature of 300° to 500° C.; tripolyphosphates at an M/P molar ratio of 1.7 at a temperature of 300° to 550° C.; and pyrophosphates at an M/P molar ratio of 2.0 and at a temperature of 300° to 550° C. (see *Ullmann's Encyclopedia of Industrial Chemistry*, Vol. A19, pp. 87–492).

On the other hand, a number of methods concerning combustion of a solution containing organic matter have been proposed to date. For example, a method comprising burning waste water containing organic matter and inorganic matter to make it harmless and recovering valuable inorganic matter is known (see JP-B-55-10803). Recovery of valuable inorganic matter from fermentation waste from an alcohol fermentation system, a glutamic acid fermentation system, an organic acid fermentation system, or the like, has also been practiced (JP-B-55-11848) However, the ideas of these techniques are confined to recovery of inorganic matter in its original form, not referring to recovery of an alkali metal polyphosphate from a phosphoric acid solution containing organic matter while eliminating unnecessary organic matter.

With the recent increase in concern about the environment, the regulation on phosphorus in waste water has been made more and more stringent. In industrial sectors using phosphorus, the importance of effectively utilizing phosphorus in waste water has been increasing significantly. It is important for environmental conservation to eliminate organic matter from a solution containing phosphoric acid and organic matter and to produce and collect an industrially useful polyphosphate therefrom. It is also important to produce various polyphosphates in the same equipment by controlling the degree of condensation, namely the number of phosphorus atoms per molecule, and to collect the polyphosphates in the form meeting the end use desired (for example, a solution, a slurry, crystals, or the like).

SUMMARY OF THE INVENTION

In the light of the above-described circumstances, the inventors of the present invention have conducted extensive investigations. As a result, they have found that combustion of a phosphate ion aqueous solution containing organic matter gives an alkali metal polyphosphate having a sufficient purity for utility. The terminology "alkali metal polyphosphate" as used herein includes alkali metal salts of hexametaphosphoric acid (degree of condensation: 4 or higher), alkali metal salts of tripolyphosphoric acid (degree of condensation: 3), alkali metal salts of pyrophosphoric acid (degree of condensation: 2), and mixtures of these polyphosphates.

The present invention provides a process for producing an alkali metal polyphosphate, comprising heating a solution comprising:

a solvent, alkali metal ions, phosphate ions, and 3 to 50% by weight of organic matter, wherein the solution contains, in total, 5 to 65% by weight of the alkali metal ions and the phosphate ions, and the ratio M/P is 1.0 to 3.0, wherein M is the number of moles of alkali metal ions in the solution and P is the number of moles of orthophosphate ions in the solution, at a temperature of 800° to 1200° C. in the presence of excess air, optionally after the solution is at least partially dried to solid, to produce the alkali metal polyphosphate.

According to the present invention, an alkali metal polyphosphate having a total organic carbon content (hereinafter abbreviated as TOC) of 10 ppm or less can be obtained from a solution containing organic matter.

The present invention also provides a process for producing an alkali metal polyphosphate, comprising heating the above solution in a submerged combuster at a temperature of 800° to 1200° C. in the presence of excess air, wherein a melt is produced in the heating step, and the melt is poured into water at a temperature of 30° to 95° C., to produce the alkali metal polyphosphate as an aqueous solution or slurry.

This process makes it possible to eliminate inorganic matter other than a desired alkali metal polyphosphate and is therefore particularly effective on solutions containing inorganic ions other than an alkali metal ion and a phosphate ion.

BRIEF DESCRIPTION OF THE DRAWING

FIG. 1 shows an example of the apparatus for carrying out the process of the present invention.

DETAILED DESCRIPTION OF THE INVENTION

The alkali metal ions to which the present invention is applicable are not particularly limited and include potassium ions, sodium ions, and the like. Taking the usefulness of the produced polyphosphate into consideration, sodium ions are preferred. If the alkali metal ion is sodium, a sodium polyphosphate is obtained.

In a preferred embodiment of the present invention, chloride ions are added to a solution containing an alkali metal ion and a phosphate ion in a total concentration of 5 to 65% by weight at an M/P molar ratio of 1.0 to 3.0 to make an (M - Cl)/ P molar ratio (wherein Cl represents a molar quantity of a chlorine atom) 1.0 to 2.0. According to this embodiment, an alkali metal polyphosphate can be obtained from a solution having an M/P molar ratio of 2.0 or higher with improved efficiency.

According to the present invention, the produced alkali metal polyphosphate having a TOC of 10 ppm or less can be provided.

The phosphate ion-containing solution which can be used in the present invention is a solution containing an alkali metal ion and a phosphate ion in a total concentration of 5 to 65% by weight at an M/P molar ratio of 1.0 to 3.0 and having an organic content of 3 to 50% by weight. An aqueous solution is preferred. That is, the solvent is preferably water. If the M/P molar ratio of a solution to be treated is out of the range of 1.0 to 3.0, it can be adjusted by addition of an alkali metal hydroxide (for example, NaOH, KOH, and the like), an alkali metal carbonate (for example, $Na_2CO_3$, $NaHCO_3$, and the like), an alkali metal chloride (for example, NaCl, KCl, and the like), phosphoric acid, an alkali metal phosphate (for example, $NaH_2PO_4$, $Na_2HPO_4$, $Na_3PO_4$, and the like), and the like.

As stated above, when a chloride ion is added to the above solution to adjust the (M - Cl)/P molar ratio to 1.0 to 2.0, a polyphosphate can be obtained efficiently. The chloride ion concentration can be adjusted by addition of hydrochloric acid or a chloride (for example, sodium chloride, potassium chloride, or the like).

The total concentration of the alkali metal ions and the phosphate ions in the solution is 5 to 65% by weight, preferably 5 to 40% by weight, even more preferably 10 to 30% by weight, such as 15, 20, 25, 35, 45, 50, 55 and 60% by weight. The organic matter present in the solution is not limited by the origin as far as it is combustible at temperatures of 800° to 1200° C., including saccharides (for example, glucose, and the like); amino acids (for example, glutamic acid, lysine, and the like); nucleotides (for example, inosinic acid, guanylic acid, and the like); nucleosides (for example, inosine, guanosine, and the like); organic acids (for example, acetic acid, malic acid, and the like); and wet microbial cells in fermentation liquids (for example, wet microbial cells of microorganisms belonging to the genera Bacillus, Brevibacterium, Corynebacterium, Escherichia, Lactobacterium, and the like). The organic content of the solution is 3 to 50% by weight, preferably 3 to 20% by weight, and more preferably 3 to 10% by weight, such as 5, 10, 15, 25, 30 and 40% by weight. The solution can contain substances other than those described above, for example, a solution originated in a fermentation liquid. If the solution contains salts derived from a carbonate ion, a sulfate ion, a chloride ion, or the like, such salts can be eliminated by pouring the melt resulting from combustion into water and subjecting the resulting aqueous solution or slurry to crystallization or the like.

The organic matter-containing solution can be directly subjected to combustion as such. If desired, the solution can be once solidified by drying before combustion. Drying to solid is carried out in a usual manner by means of a spray drier, a drum drier, and the like.

The solution having a controlled M/P molar ratio or a solid thereof is subjected to combustion in the presence of excess air. Useful combustion apparatus include a submerged combuster, a rotary kiln, and the like. While the combustion apparatus to be used is not particularly limited as far as combustion at 800° to 1200° C. can be carried out, a submerged combustor is the most suited for its capability of completely removing the dust in combustion gas. An example of a combustion apparatus using the submerged combustor is shown in FIG. 1, in which numerals 1 to 5 indicate a spray combustion furnace, a cooling tank, a scrubber, a smoke inhibitor, and a cooler for a liquid in the cooling tank, respectively; symbols B-1, B-2, and P-1 to P-4 indicate a combustion air blower, a cooling air fan, a kerosine spraying pump, a feed stock solution spraying pump, a scrubber pump, and a cooling liquid pump, respectively; symbols A to F indicate kerosine, compressed air, combustion air, a food stock solution, a condensed phosphate solution, and service water, respectively; and symbols FI, FIC, TIC and LIC indicate a flow indicator, a flow indicating controller, a temperature indicating controller, and a level indicating controller, respectively.

The combustion temperature is from 800° to 1200° C., such as 850°, 900°, 1000°, 1050°, 1100° and 1150° C. In particular, a suitable combustion temperature in a submerged combustor is 950° to 1200° C. Upon combustion at the above temperature condition in the presence of excess air, an alkali phosphate undergoes drying and dehydrating condensation to produce an alkali polyphosphate, and, at the same time, the organic matter in the solution is oxidized and eliminated. Accordingly, it is possible in the present invention to obtain an alkali metal polyphosphate having a TOC of 10 ppm or less. The TOC may also be 8 ppm or less, or 5 ppm or less.

In the present invention, the term "the presence of excess air" means that the amount of the air in the combustion is 1.1 to 1.5 times as much as the theoretical amount of the air.

In using a submerged combustor, the combustion reaction takes place in a molten state so that the produced polyphosphate is obtained as mist of a molten salt. The resulting molten salt mist falls through the inner gall of the combustor and/or directly into a liquid in a cooling tank provided beneath the combustion furnace thereby to provide a solution or slurry of an alkali metal polyphosphate. The liquid in the cooling tank is preferably water. In order to prevent the resulting polyphosphate from undergoing hydrolysis, it is important to control the temperature of the liquid in the cooling tank within a range of 30° to 95° C., preferably 65° to 85° C. Unless causing no interference with the subsequent steps, the liquid can be made alkaline to ensure prevention of the hydrolysis reaction.

The alkali metal polyphosphate can be separated as crystals from the resulting solution or slurry by conventional crystallization techniques, such as concentration, cooling, or the like. If a starting solution containing inorganic matter other than a phosphate is treated by means of the submerged combustor, the resulting solution or slurry contains other inorganic salts in addition to the alkali metal polyphosphate. In such cases, too, high purity alkali metal polyphosphate can be separated apart from the other inorganic salts by this crystallization step.

The crystals thus separated are free from dust and exhibit excellent solubility. Besides, if the submerged combustor is employed, a loss due to dusting, which is observed with other combustors such as a rotary kiln, can be avoided.

Since different polyphosphates (i.e., a pyrophosphate, a tripolyphosphate, a hexametaphosphate, and the like) have different chemical properties, such as melting points, reaction temperatures, and the like, they have been often produced in respective apparatus exclusively designed according to their chemical properties. In the present invention, however, because the produced molten salt mist falls into the cooling liquid either directly or through the wall of the combustion furnace, it is feasible to produce various desired polyphosphates by using the same piece of equipment as long as the selected temperature is above the melting point. Such production flexibility provides a great advantage in industrial manufacture.

In addition to the above-described submerged combustor, a rotary kiln is also useful to carry out the combustion reaction. In this case, combustion should be conducted at a temperature of 800° C. or higher in the presence of excess air. At temperatures below 800° C., the organic matter remains only to provide a colored alkali metal polyphosphate. In using a rotary kiln, there are obtained anhydrous alkali metal polyphosphate crystals.

The degree of the resulting alkali metal polyphosphate is controllable by changing the M/P molar ratio of the starting solution. For example, a polyphosphate mainly comprising a hexametaphosphate (degree of condensation: 4 or higher) is obtained at an M/P molar ratio of 1.0 to 1.2; a tripolyphosphate (degree of condensation: 3) at an M/P molar ratio of 1.5 to 1.8; and a pyrophosphate (degree of condensation: 2) at an M/P molar ratio of 1.8 to 3.0, respectively.

It has conventionally been important to limit the M/P molar ratio to 2 or less because orthophosphoric acid would have been produced as a chief product at an M/P molar ratio exceeding 2. According to the process of the present invention, formation of orthophosphoric acid can be suppressed even at an M/P molar ratio exceeding 2.0 thereby to form pyrophosphoric acid efficiently, which is an outstanding advantage of the present invention over the conventional techniques. If, in particular, the M/P molar ratio of the starting solution is 2.0 to 3.0, prevention of formation of orthophosphoric acid can further be ensured by adding a chloride ion to make an (M - Cl)/P molar ratio 1.0 to 2.0, which will increase the efficiency of production of a desired polyphosphate.

According to the present invention, phosphoric acid can be recovered as a useful alkali metal polyphosphate from waste water containing phosphoric acid and organic matter while eliminating the organic matter to reduce the load on the environment. The produced polyphosphate is obtainable in the form of an aqueous solution or an aqueous slurry according to the end use. If the (M - Cl)/P molar ratio of the solution to be treated is adjusted to 1.0 to 2.0, the range of the M/P molar ratio of the starting solution from which an alkali metal polyphosphate is to be produced can be broadened. Furthermore, various alkali metal polyphosphates can be manufactured by means of a simple apparatus, and a high purity alkali metal polyphosphate can be manufactured from phosphoric acid-containing waste liquid.

The present invention will now be illustrated in greater detail with reference to Examples, but it should be understood that the present invention is not construed as being limited thereto. Unless otherwise indicated, all the percents are by weight.

EXAMPLES

Example 1

Preparation of Pyrophosphate

In 581 g of water were dissolved 374 g of $Na_2HPO_4$, 20 g of inosinic acid, 10 g of inosine, and 15 g of wet microbial cells to prepare an aqueous solution containing phosphate ions, and sodium ions in a total ion concentration of about 37%, and organic matter in a concentration of about 4%. The solution was spray dried to obtain a dry product having a water content of 3.6% and an M/P molar ratio of 2.0. The dry product weighing 2 g was put in a platinum crucible and calcined in an electric furnace at 800° C. for 4 hours. For comparison, the same dry product was calcined at 500° C. for 4 hours. It was confirmed that anhydrous sodium pyrophosphate had been produced in either case in a production ratio of 90% or higher in terms of $PO_4$ (the proportion of each phosphate component in the total phosphate was expressed in terms of $PO_4$), indicating equality in progress of the dehydrating condensation reaction. However, the organic content as expressed by TOC was 1400 ppm in the 500° C. product, while it was 10 ppm or less in the 800° C. product.

Example 2

$NaH_2PO_4$ or $Na_2HPO_4$ was dissolved in water to prepare feed stock solutions (1) to (8) having a varied M/P molar ratio and/or a varied (M - Cl)/P molar ratio as shown in Table 1 below as adjusted with NaOH and/or NaCl.

The reaction apparatus shown in the flow sheet of FIG. 1 was set up, and each solution was fed to an in-liquid combustion furnace (burner: 20000 kcal/hr; furnace capacity: 61 l; amount of the liquid in a cooling tank: 10 l) at a rate of 2 l/hr and burnt continuously at the furnace temperature and the liquid temperature shown in Table 1. After 2-hour continuous combustion, the phosphate components in the recovered liquid were analyzed. The results obtained are shown in Table 2. It is seen that the production ratios of the phosphates vary depending on the M/P molar ratio of the feed solution. That is, the resulting polyphosphate solution mainly comprised a hexametaphosphoric acid component (degree of condensation: 4 or higher) at an M/P molar ratio of 1.0 (solution (1)), a tripolyphosphoric acid component (degree of condensation: 3) at an M/P molar ratio of 1.7 (solution (2)), or a pyrophosphoric acid component (degree of condensation: 2) at an M/P molar ratio of 2.0 to 2.6 (solutions (3) to (8)). With the M/P molar ratio being equal, the higher chloride ion concentration the feed solution has (i.e., the lower the (M - Cl)/P molar ratio), the higher the degree of condensation has the resulting polyphosphate (solutions (3) to (4) and solutions (5) to (7)).

Even if starting with a feed stock solution having an M/P molar ratio of 2 or higher (solutions (5) to (8)), a polyphosphate (pyrophosphate) was obtained in a yield of 80% or higher.

TABLE 1

Feed Solution Composition and Combustion Condition

| Solution No. | Molar Ratio M/P | (M-Cl)/P | Concentration (mol/l) $PO_4$ | Cl | Na | Combustion Temperature (°C.) | Liquid Temperature (°C.) |
|---|---|---|---|---|---|---|---|
| 1 | 1.0 | 1.0 | 2.4 | 0.0 | 2.4 | 990 | 75 |
| 2 | 1.7 | 1.7 | 2.2 | 0.0 | 3.7 | 980 | 83 |
| 3 | 2.0 | 1.0 | 1.7 | 1.7 | 3.4 | 1000 | 75 |
| 4 | 2.0 | 1.5 | 1.7 | 0.9 | 3.4 | 1050 | 75 |
| 5 | 2.3 | 1.0 | 1.7 | 2.2 | 3.9 | 1045 | 75 |
| 6 | 2.3 | 1.4 | 1.6 | 1.3 | 3.6 | 1040 | 75 |
| 7 | 2.3 | 1.9 | 1.6 | 0.6 | 3.6 | 1040 | 75 |
| 8 | 2.6 | 1.9 | 1.8 | 1.1 | 4.6 | 1020 | 75 |

TABLE 2

Compositions of Feed Solution and Produced Polyphosphate

| Solution No. | Molar Ratio | | Phosphoric Acid Component Ratio (%) in the Recovered Liquid | | | | |
|---|---|---|---|---|---|---|---|
| | M/P | (M-Cl)/P | Hexa[1] | Trim[2] | Trip[3] | Pyro[4] | Ortho[5] |
| 1 | 1.0 | 1.0 | 86 | 10 | 0 | 0 | 3 |
| 2 | 1.7 | 1.7 | 0 | 0 | 60 | 36 | 4 |
| 3 | 2.0 | 1.0 | 0 | 0 | 14 | 72 | 14 |
| 4 | 2.0 | 1.5 | 0 | 0 | 6 | 90 | 4 |
| 5 | 2.3 | 1.0 | 0 | 0 | 6 | 83 | 11 |
| 6 | 2.3 | 1.4 | 0 | 0 | 0 | 93 | 7 |
| 7 | 2.3 | 1.9 | 0 | 0 | 0 | 85 | 15 |
| 8 | 2.6 | 1.9 | 0 | 0 | 0 | 82 | 18 |

Note:
[1]: Hexametaphosphate
[2]: Trimetaphosphate
[3]: Tripolyphosphate
[4]: Pyrophosphate
[5]: Orthophosphate While the invention has been described in detail and with reference to specific examples thereof, it will be apparent to one skilled in the art that various changes and modifications can be made therein without departing from the spirit and scope thereof.

The priority application, Japanese patent application No. Hei 9-210469, filed Aug. 5, 1997, is incorporated herein by reference in its entirety.

What is claimed is:

1. A process for producing an alkali metal polyphosphate, comprising heating a solution comprising:

a solvent, alkali metal ions, phosphate ions, and 3 to 50% by weight of organic matter, wherein the solution contains, in total, 5 to 65% by weight of the alkali metal ions and the phosphate ions, and the ratio M/P is 1.0 to 3.0, wherein M is the number of moles of alkali metal ions in the solution and P is the number of moles of orthophosphate ions in the solution, at a temperature of 800° to 1200° C. in the presence of excess air, to produce the alkali metal polyphosphate.

2. The process according to claim 1, which is conducted after the solution is at least partially dried to solid.

3. The process according to claim 1, which is conducted in a submerged combuster.

4. The process according to claim 1, which is conducted in a submerged combuster at a temperature of 950° to 1200° C.

5. The process according to claim 1, which is conducted in a submerged combuster, wherein a melt is produced in the heating step, and the melt is poured into water at a temperature of 30° to 95° C. to produce the alkali metal polyphosphate as an aqueous solution or slurry.

6. The process according to claim 5, wherein the melt is poured into water at a temperature of 65° to 85° C.

7. The process according to claim 1, wherein the alkali metal ions comprise sodium ions.

8. The process according to claim 1, wherein the alkali metal ions comprise potassium ions.

9. The process according to claim 1, wherein the solution contains chloride ions, and prior to the heating step the ratio (M - Cl)/P is 1.0 to 2.0, wherein Cl is the number of moles of chloride ions in the solution and M and P are as defined above.

10. The process according to claim 1, wherein the solvent comprises water.

11. The process according to claim 1, wherein the alkali metal polyphosphate has a total organic carbon content (TOC) of 10 ppm or less.

12. The process according to claim 1, wherein the solution contains, in total, 5 to 40% by weight of the alkali metal ions and the phosphate ions.

13. The process according to claim 1, wherein the solution contains, in total, 10 to 30% by weight of the alkali metal ions and the phosphate ions.

14. The process according to claim 1, wherein the organic matter comprises at least one member selected from the group consisting of saccharides, amino acids, nucleotides, nucleosides, organic acids and wet microbial cells.

15. The process according to claim 1, wherein the solution contains 3 to 20% by weight of the organic matter.

16. The process according to claim 1, wherein the solution comprises 3 to 10% by weight of the organic matter.

17. The process according to claim 1, wherein the alkali metal polyphosphate comprises a hexametaphosphate, a tripolyphosphate, a pyrophosphate, or a mixture thereof.

18. The process according to claim 1, which is conducted in a rotary kiln.

* * * * *